United States Patent
Blasing

(10) Patent No.: US 6,555,804 B1
(45) Date of Patent: Apr. 29, 2003

(54) METHOD AND DEVICE FOR DETECTING OBJECTS ON A WINDSHIELD

(75) Inventor: Frank Blasing, Werl (DE)

(73) Assignee: Leopold Kostal GmbH & Co. KG, Ludenscheid (DE)

(*) Notice: Subject to any disclaimer, the term of this patent is extended or adjusted under 35 U.S.C. 154(b) by 0 days.

(21) Appl. No.: 09/530,634

(22) PCT Filed: Nov. 6, 1998

(86) PCT No.: PCT/EP98/07085

§ 371 (c)(1), (2), (4) Date: Jul. 18, 2000

(87) PCT Pub. No.: WO99/26816

PCT Pub. Date: Jun. 3, 1999

(30) Foreign Application Priority Data

Nov. 7, 1997 (DE) .......................................... 197 49 331

(51) Int. Cl.[7] .................................................. B60S 1/08
(52) U.S. Cl. ................................ 250/208.1; 250/341.7; 318/643; 318/443; 318/444; 382/104; 382/278; 382/280; 356/239.1; 356/239.8
(58) Field of Search ........................... 318/483, DIG. 2, 318/643, 443, 444, 568.7; 382/232; 250/208.7, 227.25

(56) References Cited

U.S. PATENT DOCUMENTS

| | | | | |
|---|---|---|---|---|
| 5,453,676 A | * | 9/1995 | Agrotis et al. | 318/443 |
| 5,526,295 A | * | 6/1996 | Astle | 382/232 |
| 5,923,027 A | * | 7/1999 | Stam et al. | 15/DIG. 15 |

* cited by examiner

Primary Examiner—Richard A. Rosenberger
Assistant Examiner—Vincent P Barth

(57) ABSTRACT

The invention relates to a method and device for detecting objects (3) on a windshield (2). The method comprises the following steps: Placing an optical sensor array (4) on the inner side of a section of the windshield (2), said array having a plurality of individual pixels and being focused on the outer side (7) of the windshield (2); determining the local frequency spectrum S(f) of the intensity fluctuations of pixels of the sensor array (4), said pixels being combined in one or more blocks, and afterwards; evaluating the local frequency spectrum, whereby the detected local frequency spectrum S(f) is compared to one or more reference frequency distributions, and whereby a control signal for triggering one or more actuators is generated when the determined local frequency spectrum S(f) sufficiently conforms to a reference frequency distribution. The device comprises a detecting unit (4) connected to a data processing unit (5). The detecting unit is a sensor array (4) which is provided with an aperture (9) and is arranged at a certain distance behind the windshield (2).

14 Claims, 3 Drawing Sheets

METHOD AND DEVICE FOR DETECTING OBJECTS ON A WINDSHIELD

TECHNICAL FIELD

The invention relates to the field of detecting objects on a transparent glazing. In particular, the invention relates to a process and a device for detecting objects found on a windshield, comprising a detector unit connected to a data processing unit to view a section of the windshield from the inside, which data processing unit can control actuators in response to objects being determined on the windshield, whereby the detector unit is arranged at a certain distance behind the windshield.

BACKGROUND ART

DE 197 04 818 A1 discloses a device, also referred to as rain sensor, to detect raindrops on a windshield of a motor vehicle to control a windshield wiper motor. This prior art device works on the basis of a reflection principle, with total reflection occurring on the outside of the windshield if no objects are present on the outside of the windshield to interfere with this total reflection. If the light rays strike a raindrop, however, they are decoupled from the raindrop such that a portion is reflected toward a photodetector and the measured light intensity is reduced.

This prior art rain sensor uses a one- or two-dimensional CCD charged coupled device as the sensor array, with a focusing lens being connected ahead of the photosensitive surface. To analyze the structures detected by the sensor array, the transducers of the sensor array are read as a one- or two-dimensional value field from the sensor array and are compared with a reference value field. If sufficient correspondence with a reference value field is determined, a corresponding control signal is generated to control one or several actuators. The value field provided is a curve reproducing the intensities of a pixel series.

Although this rain sensor is suitable for detecting raindrops, it cannot be excluded that the information detected by the CCD is not also of a background-related origin. The resulting wiping action is therefore not always satisfactory. Furthermore, this device is not able to provide specific information with respect to other objects impeding visibility through the windshield. Even though various types of dirt on the windshield can also cause refraction and thus reduced total reflection of the light rays, this light intensity reduction detected by the photodetector cannot be evaluated in relation to the object.

SUMMARY OF THE INVENTION

Based on the discussed prior art, it is thus the objective of the invention to propose a process for detecting objects found on a windshield that can be used reliably to detect and differentiate objects that are found on the windshield.

A further objective of the invention is to provide a device of the generic class for detecting an object found on a windshield permitting largely interference-free detection and determination of different objects found on a windshield.

The process according to the invention for detecting objects found on a windshield uses the signal fluctuations of the entire image, or of a specific image area, present on the output side on the pixels of the sensor array when viewing a scene, which in the form of correspondingly transformed spatial frequency spectra can provide information on an object found on the windshield. With respect to the term "spatial frequency spectrum" or "spectra" as used in these explanations, it should be noted that this term also covers the characteristic of the spectral power density of a frequency band across the entire, or across a specific portion of, the sensor array. For this purpose, an aperture and lens are inserted in the beam path of the sensor array directed toward the windshield, such that the photosensitive surface of the sensor array is focused on the outside of the windshield and objects found on the windshield are thus sharply reproduced on the sensor array. The invention uses the fact that an optically unfocused and thus unclear image does not have sharp transitions from one object to the next. The component of high spatial frequencies, such as they occur, according to Fourier, in signal jumps with sharp transitions, is low in such an image segment. Within the focused image plane, however, sharp object transitions can be detected-provided objects are present. Within the context of these explanations, the term "focused" means a sufficiently sharp image of the object on the photosensitive surface of the sensor array such that this image is clearly distinguished with respect to its sharpness from objects of the environment. The use of a diaphragm connected ahead of the lens produces a certain depth of field range so that, for example, the inside surface of the windshield, compared to objects of the environment, is also in the focused range of the sensor array. If objects are present within the depth of field range of the device and thus on the outside of the windshield, the spectrum of the determined spatial frequency distributions in the upper frequency range considered will have greater values compared to an image segment represented by its spatial frequency spectra in which no objects adhere to the outside of the windshield.

The process or the device, according to the invention, provides information regarding the objects adhering to a windshield based on the different image properties of different objects with respect to their spatial frequency spectra. Raindrops, for example, can be differentiated from opaque objects in that they have a dark margin along the edge while the interior of a raindrop is light. Furthermore, the fact can be used that a raindrop itself can act as a lens so that the environment in front of the windshield appears sharp and reversed on the sensor array. Due to this reversed image, the lower part of a raindrop is light (=sky) and the upper part is dark or darker (=environment). All these characteristics are expressed in intensity fluctuations in the high-frequency range of the spatial frequency spectra. Accordingly, the number of objects adhering to a windshield is determined across the entire image segment being considered. Making use of this fact, an exemplary embodiment provides that a vertically oriented sensor line be used as the sensor array.

According to a first proposed solution, once the spatial frequency spectra of an image segment have been determined, they are compared with reference frequency spectra that are suitably stored in a memory module. If there is sufficient correspondence between the detected spatial frequency spectra and a reference frequency spectrum for example, when a certain raindrop density is determined-a control signal is generated, which is used to actuate a specific actuator, e.g., a windshield wiper motor to wipe away the raindrops.

The distinction between different objects can be used to control not only the windshield wiper motor, but if dust or mud splatters are detected, also the windshield washer to remove the dirt.

According to a second proposed solution, the spatial frequency spectra of the pixels of the sensor array combined into blocks are determined as the characteristic of the spectral power density of one or several frequency bands across all blocks and are subsequently evaluated by neural analysis. This analysis is carried out in several steps. In a first analysis step, the determined spatial frequency spectra of the individual blocks are converted by means of a weight matrix into internal stimuli of the neuron associated with the frequency band. In a second analysis step, in the neuron associated with each frequency band, the number of stimuli is determined and then compared with an internal firing threshold. If this threshold is exceeded, the corresponding neuron fires. The firing of the corresponding neuron can then generate a control signal to control one or more actuators.

A preferred embodiment provides that the firing signal of the neuron(s) be applied to a statistics module, which also receives other data as input variables, for example, data regarding exposure time control, so-called clipping detection, expert knowledge, wiper status information, as well as other variables, based on which the actual control of the actuators is then effected. The statistics module can furthermore be used to adapt the weight matrix, adapt the firing conditions, control active infrared illumination, or the like. Such an analysis of the spatial frequency spectra permits precise wiper control that can automatically adapt to changing environmental conditions.

Advantageously, the spatial frequency spectra of an image detected by the optical sensor array are determined by transforming the image data with a discrete cosine transform. This discrete cosine transform is the real component of the two-sided complex Fourier transform, which reduces the computation effort required to realize the transformation.

Between the step of determining the spatial frequency spectra and executing the comparison step, it is advantageous to subject the individual spatial frequency bands to time-recursive lowpass filtering or to spatially discrete time-recursive lowpass filtering. Such filtering suppresses the analysis of phantom frequencies.

Since a robust exposure time control for operation in daylight conditions can follow a rapid change only with a certain dead time, the sensor signal may overload for short periods at individual points of the signal. It is therefore advantageous to supply the individual pixels of the optical sensor array to an overload determination, which determines whether individual pixels are overloaded with respect to their detection range. The signal of an overloaded pixel is distinguished in that the rising signal edge suddenly changes to the horizontal in a sharp bend. The other signal edge is formed accordingly. These two bends in the signal when transformed into the spatial frequency range result in supposed high-frequency image components that do not actually exist. If an overload of one or more pixels is determined, this is taken into account when the comparison step is executed. It is advantageous if such an overload-monitoring unit correspondingly influences the evaluation unit so that the generation of stimuli by overloaded signal components is inhibited.

Even though it is not necessary in principle for the implementation of the process as intended additionally to illuminate the windshield, there may be driving situations where the residual ambient light is not sufficient to detect the objects adhering to the windshield. For this purpose, such a device may be associated with an illumination unit that illuminates the windshield from the inside. This illumination unit emits infrared light such that said light strikes the windshield at alternating angles of incidence. The light reflexes generated by the illumination are used as the basis to determine the spatial frequency spectrum in the detected image segment.

When a camera sensor is used as the sensor array, it can furthermore be used as a detector module for other image processing techniques.

BRIEF DESCRIPTION OF THE DRAWINGS

Additional advantages and embodiments of the invention form part of the remaining subclaims as well as of the following description of exemplary embodiments, in which:

BEST MODES FOR CARRYING OUT THE INVENTION

Figure 1:
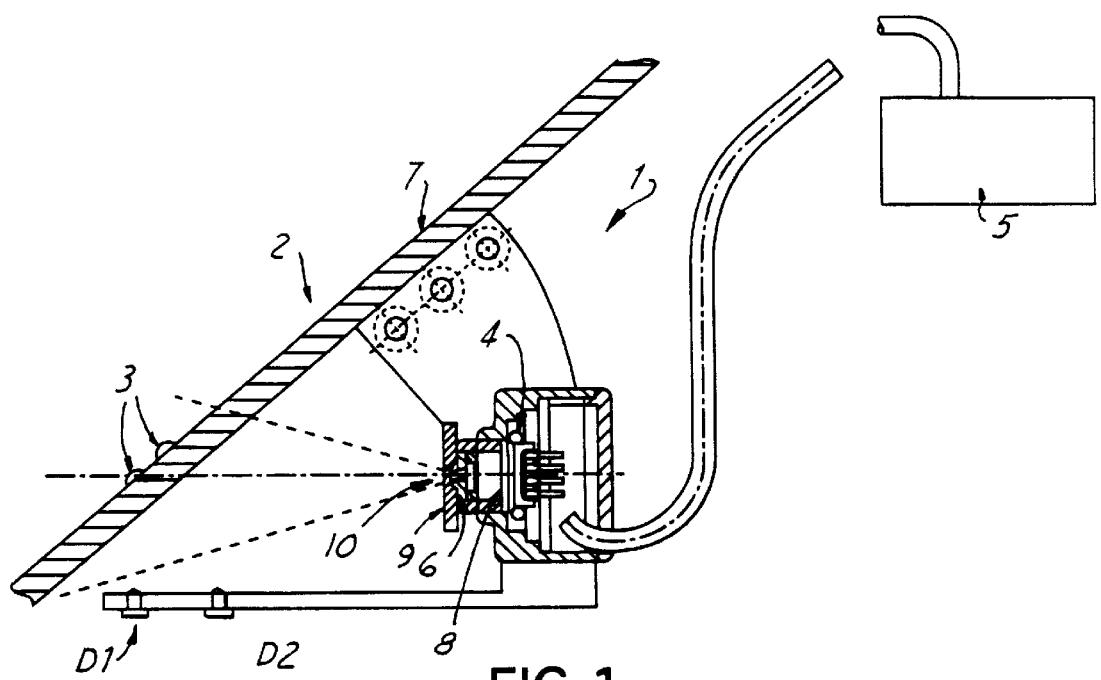
FIG. 1 is a schematic representation of a device for detecting objects found on a windshield.

A detection device 1 for detecting objects 3 found on a windshield 2—with the objects shown in FIG. 1 being raindrops—is arranged at a predefined distance behind windshield 2 in the interior of a motor vehicle (not further depicted). The detection device 1 essentially comprises an optical sensor line 4 connected to a data processing unit 5. Between windshield 2 and sensor line 4, a lens 6 is arranged such that the outside 7 of windshield 2 is sharply reproduced on the photosensitive surface 8 of sensor line 4. In the beam path in front of the lens an aperture diaphragm 9 is arranged, the aperture opening 10 of which is used to achieve a certain depth of field. This depth of field permits the arrangement of detection device 1 behind windshield 2 with certain tolerances without having to accept any loss in the desired sharpness of the image. Likewise, the inside of windshield 2 can be within the depth of field range of sensor line 4 such that the detection device 1 can also be used to detect inside fogging of windshield 2. Furthermore, with a certain depth of field, surface 8 of sensor line 4 can be disposed in a non-parallel arrangement to windshield 2 as shown in FIG. 1, with the entire windshield segment detected by sensor line 4 being sharply reproduced on surface 8 of sensor line 4.

Sensor line 4 comprises a plurality of individual optoelectronic transducers (pixels) arranged side by side. Within the motor vehicle, sensor line 4 is integrated in the base of a rearview mirror (not further depicted). Sensor line 4 is integrated in the mirror base such that the line is vertical. In addition, detection device 1 includes an illumination unit comprising four infrared light emitting diodes D1, D2 that are arranged outside the detection range of sensor line 4 as well as outside the alignment of sensor line 4. FIG. 1 shows only the IR diodes D1, D2 that are arranged to the left of sensor line 4. This illumination unit serves to illuminate windshield 2 from the inside if there is not sufficient ambient light to detect objects found on windshield 2. The exemplary embodiment provides that IR diode D1 is operated together with the diagonally opposite diode adjacent to IR diode D2 and, correspondingly, IR diode D2 with its diagonally opposite diode, such that windshield 2 is alternately illuminated at different angles of incidence of the IR light beams. This makes it possible to distinguish, for instance, object-related light reflection from other parasitic light reflections.

Figure 2:
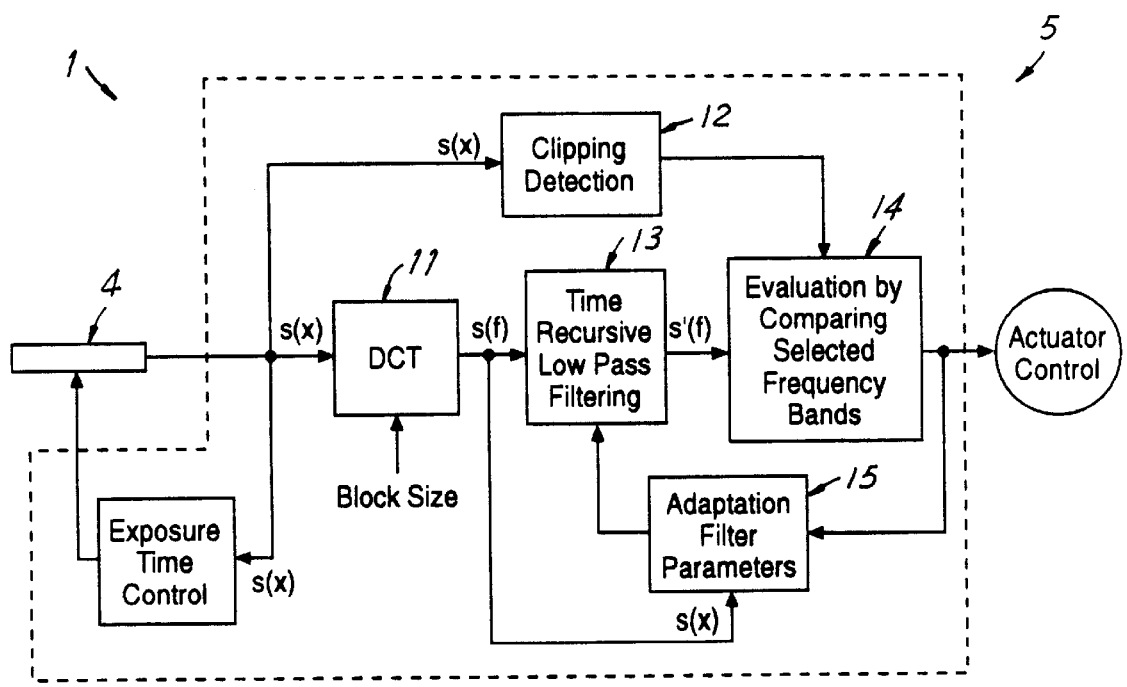
FIG. 2 is a block diagram according to a first embodiment for analyzing the image of a windshield segment detected by an optical sensor array.

FIG. 2 shows a schematic block diagram of evaluation unit 5. Sensor line 4 on the output side is connected to the input of evaluation unit 5. Detection device 1 is controlled by a microprocessor (not further depicted). This microprocessor controls the exposure time, with the control signal being applied to sensor line 4.

The signals s(x) read from the individual pixels of sensor line 4 are applied to the input of a transformation module 11 in which the signals s(x) are analyzed with respect to their intensity fluctuations. By transforming the image data with a discrete cosine transform, these intensity fluctuations can be represented as spatial frequency spectrum S(f) within a certain image area, or across the entire detected image.

Parallel to the step of determining the spatial frequency spectra S(f), signals s(x) read from sensor line 4 are also applied to an overload-monitoring unit 12 for clipping detection. This overload monitoring unit 12 serves to detect overloaded pixels, which due to the shape of their signal would be detected as high frequency fluctuations when the spatial frequency spectra are determined. The overload-monitoring unit 12 generates a control signal if one or more pixels are overloaded with respect to the detected light intensity.

The output of transformation module 11 is connected to the input of a time-recursive lowpass filter 13. This lowpass filter 13 filters the frequency bands to prevent further analysis of phantom frequencies. The time lowpass filtered frequency bands S*(f) are applied to a comparator unit 14 whose other input is connected to the output of the overload monitoring unit 12. Lowpass filter 13 can be adapted with respect to its filter parameters via an adaptation unit 15, whereby adaptation unit 15 is connected to the output of comparator unit 14.

Comparator unit 14 compares the time lowpass filtered spatial frequency spectra S*(f) with reference frequency bands that are stored in a memory module. This comparison serves to evaluate the detected image data of sensor line 4, i.e., an evaluation with respect to objects adhering to the outside of windshield 2 that can be detected through different spatial frequency spectra. If a spatial frequency band of an image of sensor line 4 is recognized as known, a control signal to control the required actuators is generated, which in the exemplary embodiment shown in FIG. 1 is a windshield wiper motor.

Figure 3A:
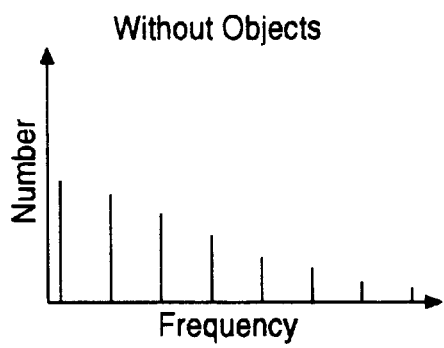
FIG. 3a is a spatial frequency spectrum, by way of example, of a windshield being viewed without any objects being found thereon.
Figure 3B:
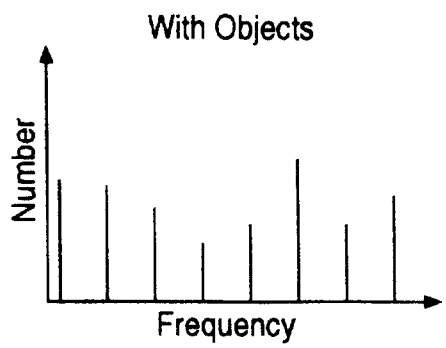
FIG. 3b is a spatial frequency spectrum, by way of example, of a windshield being viewed with several raindrops being found thereon.

FIGS. 3a and 3b show a comparison between the spatial frequency spectrum of a line image of sensor line 4 without objects adhering to the outside of windshield 2 and one with raindrops 3 adhering to the windshield. FIG. 3a shows the spatial frequency spectra of an image of a free windshield; FIG. 3b shows windshield 2 with raindrops 3 adhering to the outside as shown in FIG. 1. The diagrams plot the rate of occurrence of the fluctuations (number) on the y-axis and the frequency on the x-axis. Comparing the two diagrams makes it clear that the spatial frequency spectrum of the free windshield segment shows only low energies in the high frequency range. The high frequency range of windshield 2 with adhering raindrops 3 as shown in FIG. 1 behaves differently, however (see FIG. 3b). The intensity fluctuations caused by raindrops 3 are represented by corresponding intensities in the high frequency range. Detection of such a spatial frequency spectrum shown by way of example in FIG. 3 permits the conclusion that objects are adhering to the outside of the windshield. As a function of the resolution of sensor line 4, this makes it possible to detect different objects found on the windshield based on the different form of their high-frequency spatial frequency spectra. Spatial frequency spectra can be distinguished not only in view of object detection but also to determine the rate of occurrence of these objects found on the windshield. Accordingly, object mixtures can also be detected. A comparison of the spatial frequency spectra can also be executed in comparator unit 14 such that only a sufficient correspondence between the spatial frequency spectra to be evaluated and those stored in a memory module is determined.

Figure 4:
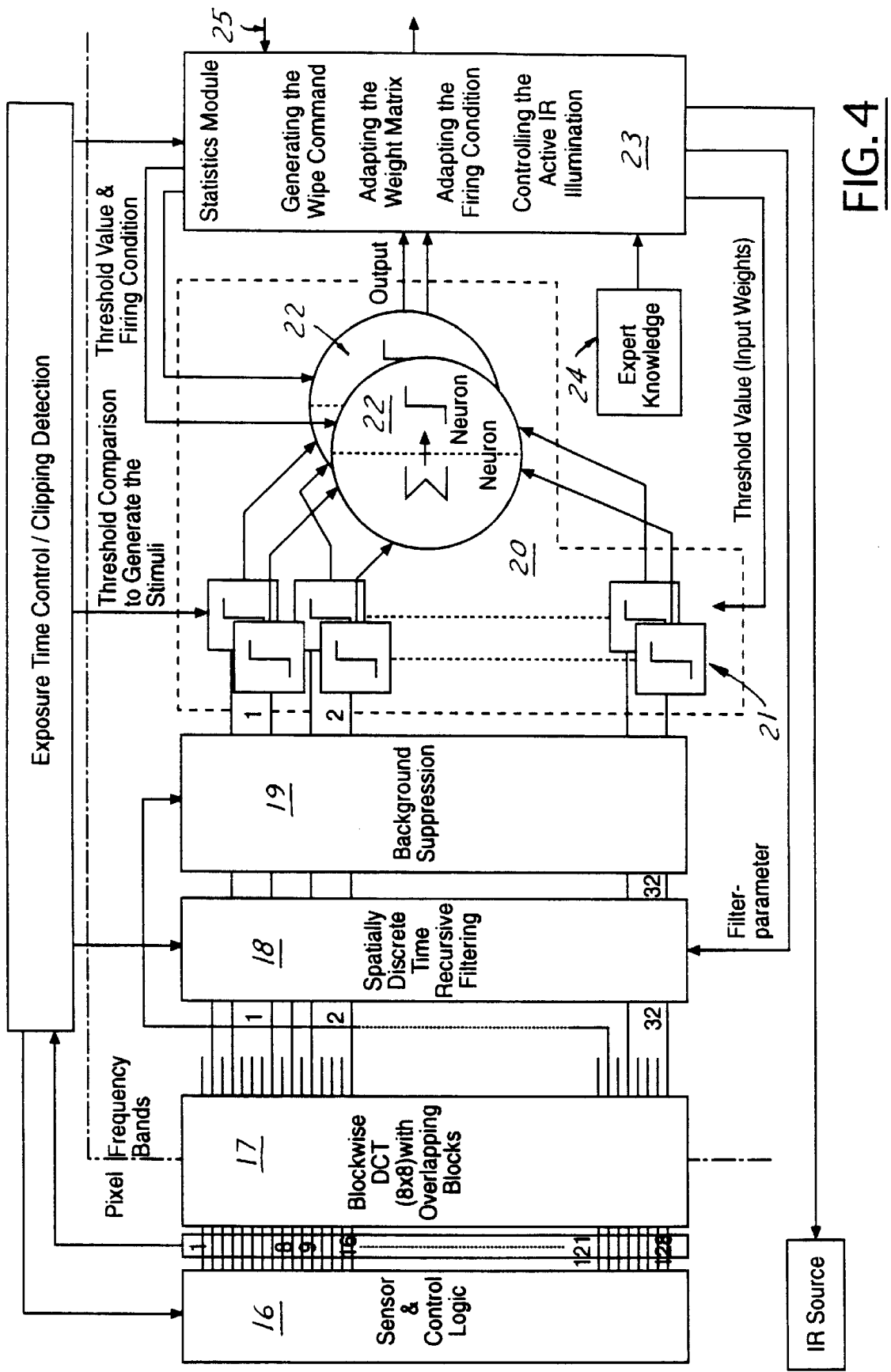
FIG. 4 is a block diagram according to a further embodiment to analyze the image of a windshield segment detected by an optical sensor array.

FIG. 4 shows a schematic block diagram of an additional process for detecting objects found on a windshield. The process shown uses a line sensor 16 with 128 transducers. The individually read intensity values of the transducers are supplied to a transformation module 17 in which the intensities are subjected block-wise with overlapping blocks to a discrete cosine transform to determine the spatial frequency spectra as the characteristic of the spectral power density across a frequency band. The block size selected in this example is 8 transducers such that, with a corresponding overlap with the adjacent blocks, 32 spatial frequency spectra are available on the output side on transformation module 17 for each frequency band to be analyzed, with two frequency bands being evaluated in the example depicted. To eliminate phantom frequencies, the spatial frequency spectra are subjected to spatially discrete and time-recursive filtering in an additional processing step. For this purpose a filter module 18 is connected to transformation module 17 on the output side. The output of filter module 18 is applied to the input of a background suppression module 19 to further suppress environmental interference. The background suppression used is described below in reference to FIG. 5. The correspondingly filtered spatial frequency spectra of the 32 blocks adapted with respect to background phenomena are subsequently applied to an evaluation module 20. The evaluation module applies neural analysis to the spatial frequency spectra present on the input side with respect to the two desired frequency bands. This analysis is done in two steps. In a first step, the spatial frequency spectra are applied to weight matrix 21 for a threshold comparison between spatial frequency spectra and reference spectra to generate stimuli. For each comparison of a spatial frequency spectrum of a block or power band where the threshold is determined to be exceeded, a stimulus is generated that is assigned to a neuron 22, 22' associated with the respective frequency band to execute a further evaluation step. In each neuron 22,22' the stimuli received in one cycle are cumulated and compared with a threshold number (=firing threshold). If a neuron 22, 22' receives a number of stimuli exceeding the firing threshold, the firing condition of the neuron is met so that the respective neuron 22 or 22' fires.

The use of a neural analysis system makes it possible to adapt the comparison steps to be executed to changing environmental conditions with much greater variability than would be possible with a single-step analysis. The wiping result is correspondingly enhanced when this evaluation process is used.

Via a statistics module 23, which also receives the content of an expert module 24 with certain expert knowledge, environmental conditions and previously known conditions are supplied to the evaluation process or its individual modules 18, 19, 20. The fired output signals of neurons 22, 22' are therefore applied to statistics module 23. Statistics module 23, however, generates a control command for actuator control only if certain additional conditions are met that make wiping the windshield actually necessary. Via input 25, statistics module 23 also receives information regarding the wiper status.

Statistics module 23 via corresponding control signals influences the filter parameters of filter module 18, weight matrix 21, as well as neurons 22, 22'. In addition, statistics module 23 is used to control the infrared illumination assigned to sensor unit 16 as required.

The evaluation process shown in FIG. 4 is furthermore modulated by an exposure time control as well as by overload detection (clipping detection), which is applied to several modules and operates according to the exemplary embodiment described with respect to FIG. 2.

Figure 5:
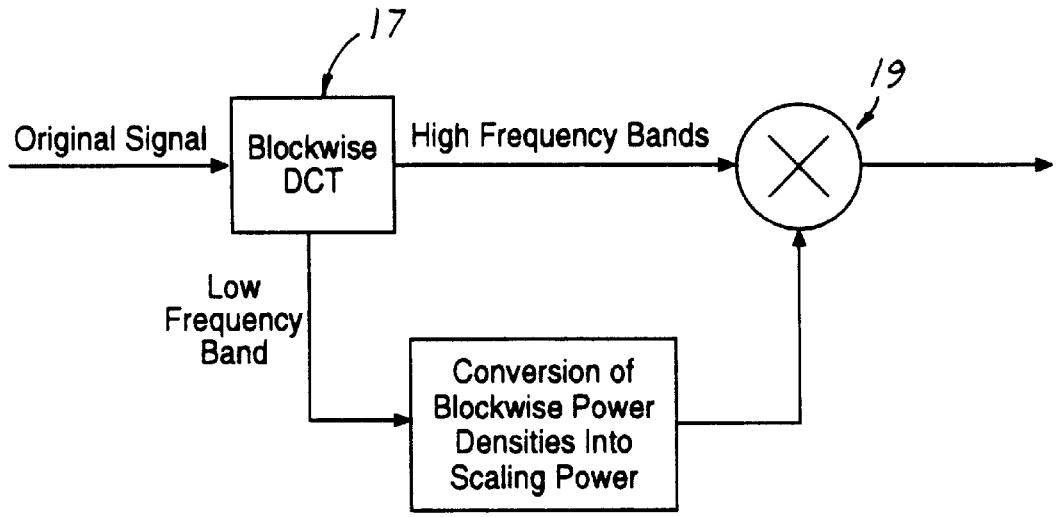
FIG. 5 is a schematic diagram representing the background suppression realized in FIG. 4.

The background suppression module 19 operates according to the sequence schematically shown in FIG. 5. This suppression of environmental interference performed in the background suppression module 19 is based on the finding that environmental signal components of high dynamics are noticeable in both high and low frequency bands, whereas objects found on the windshield, such as raindrops, generate intensities only in high frequency bands. To suppress the environmental intensities in the high frequency bands to be analyzed, the intensities reflected in the low frequency bands represented by the block-wise power densities are converted into a scaling factor with which the high frequency bands to be analyzed are adjusted. This can occur by either suppressing these frequency components in the background suppression module 19 or by correspondingly adapting the first weight matrix 21.

The indicated process steps for analyzing sensor array signals can be implemented in part or as a whole in the form of a data processing program.

List of Reference Numbers 1 detection device
2 windshield
3 raindrops
4 sensor line
5 evaluation unit
6 lens
7 outside of windshield
8 photosensitive surface of sensor line
9 aperture diaphragm
10 aperture opening
11 transformation module
12 overload monitoring unit
13 lowpass filter
14 comparator unit
15 adaptation unit
16 line sensor
17 transformation module
18 filter module
19 background suppression module
20 evaluation module
21 weight matrix
22, 22' neuron
23 statistics module
24 expert module
25 input
D1, D2 IR diodes
s(x) image signal
S(f) spatial frequency spectrum
S*(f) lowpass filtered spatial frequency spectrum

What is claimed is:

1. A method for detecting the presence of objects on a windshield, the method comprising:
acquiring an image of a portion of the windshield with an optical sensor array, the optical sensor array being divided into a plurality of blocks with each block containing a plurality of pixels, the optical sensor array being placed inside to the windshield, wherein the portion of the windshield is imaged onto the pixels of the optical sensor array in focus and objects away from the windshield are imaged onto the pixels of the optical sensor array in a blurred state;
evaluating signals of the pixels of the optical sensor array blockwise;
transforming the blockwise evaluated signals into spatial frequence spectra of intensity fluctuations;
comparing the spatial frequency spectra of the individual blocks with reference frequency spectra to determine correspondence between the spatial frequency spectra and the reference frequency spectra; and
generating a control signal to control an actuator in response to a sufficient correspondence between the spatial frequency spectra and the reference frequency spectra.

2. The method of claim 1 wherein:
the step of transforming includes using a discrete cosine transform to transform the blockwise evaluated signals of the optical sensor array into spatial frequency spectra of intensity fluctuations.

3. The method of claim 1 further comprising:
performing a time-recursive lowpass filtering of the at least one frequency band after the step of transforming.

4. The method of claim 3 wherein:
filter parameters of the low pass filtering are adaptable.

5. The method of claim 1 further comprising:
carrying out an overload determination of the pixels of the optical sensor array prior to the step of transforming, wherein the first evaluation step of analyzing the spectral frequency spectra takes into account any determined pixel overload.

6. The method of claim 1 further comprising:
illuminating the portion of the windshield from the inside with infrared light with the directions of incidence of the light changing during illumination.

7. The method of claim 1 further comprising:
executing background suppression by modulating high frequency bands as a function of the intensity fluctuations detected in low frequency bands.

8. A method for detecting the presence of objects on a windshield, the method comprising:
acquiring an image of a portion of the windshield with an optical sensor array having pixels, the optical sensor array being placed inside with respect to the windshield, wherein the portion of the windshield is imaged onto the pixels of the optical sensor array in focus and objects away from the windshield are imaged onto the pixels of the optical sensor array in a blurred state;
evaluating signals of the pixels of the optical sensor array blockwise, wherein the optical sensor array is divided into a plurality of blocks with each block containing a plurality of pixels;
transforming the blockwise evaluated signals of the optical sensor array into spatial frequency spectra of intensity fluctuations as characteristics of the spectral power density of frequency bands across the pixels of the blocks; and analyzing the spatial frequency spectra of the blocks in a multi-step evaluation of the spatial frequency spectra with respect to the characteristics of the spectral power density of the frequency bands across the pixels of the blocks, whereby in a first evaluation step, the spatial frequency spectra of each block with respect to the frequency bands are compared with a reference frequency spectrum and a signal is provided if this is exceeded in a step of comparison of the previous block- and frequency-band related comparison with a threshold, whereby in a second evaluation step, the number of the signals provided in the first evaluation step in respect to the frequency bands is determined and compared with a threshold allocated to each frequency band; and generating a control signal to control an actuator when the threshold is exceeded.

9. The method of claim 8 wherein:

the step of transforming includes using a discrete cosine transform to transform the blockwise evaluated signals of the optical sensor array into spatial frequency spectra of intensity fluctuations.

10. The method of claim 8 further comprising:

performing a time-recursive lowpass filtering of the at least one frequency band after the step of transforming.

11. The method of claim 10 wherein:

filter parameters of the low pass filtering are adaptable.

12. The method of claim 8 further comprising:

carrying out an overload determination of the pixels of the optical sensor array prior to the step of transforming, wherein the first evaluation step of analyzing the spectral frequency spectra takes into account any determined pixel overload.

13. The method of claim 8 further comprising:

illuminating the portion of the windshield from the inside with infrared light with the directions of incidence of the light changing during illumination.

14. The method of claim 8 further comprising:

between the steps of transforming and analyzing, executing background suppression by modulating the high frequency bands as a function of the intensity fluctuations detected in the low frequency bands.

* * * * *

UNITED STATES PATENT AND TRADEMARK OFFICE
CERTIFICATE OF CORRECTION

PATENT NO.   : 6,555,804 B1
DATED        : April 29, 2003
INVENTOR(S)  : Frank Blasing It is certified that error appears in the above-identified patent and that said Letters Patent is hereby corrected as shown below:

Column 8,
Line 16, delete "frequence" and insert -- frequency --.

Signed and Sealed this

First Day of July, 2003

JAMES E. ROGAN
*Director of the United States Patent and Trademark Office*